(12) United States Patent
Unkrich

(10) Patent No.: US 7,826,310 B2
(45) Date of Patent: Nov. 2, 2010

(54) ACOUSTIC NAVIGATION DEVICE AND METHOD OF DETECTING MOVEMENT OF A NAVIGATION DEVICE

(75) Inventor: Mark A. Unkrich, Emerald Hills, CA (US)

(73) Assignee: Avago Technologies Wireless IP (Singapore) Pte. Ltd., Singapore (SG)

( * ) Notice: Subject to any disclaimer, the term of this patent is extended or adjusted under 35 U.S.C. 154(b) by 321 days.

(21) Appl. No.: 11/856,823

(22) Filed: Sep. 18, 2007

(65) Prior Publication Data

US 2009/0073811 A1    Mar. 19, 2009

(51) Int. Cl.
*G01S 1/00* (2006.01)
*G06F 3/043* (2006.01)

(52) U.S. Cl. ..................................... 367/127

(58) Field of Classification Search ................. 367/125, 367/127, 96, 907; 178/18.04
See application file for complete search history.

(56) References Cited

U.S. PATENT DOCUMENTS

| 4,991,148 A | * | 2/1991 | Gilchrist | 367/907 |
| 5,239,139 A | * | 8/1993 | Zuta | 367/907 |
| 2006/0196272 A1 | * | 9/2006 | Sugiura et al. | 73/599 |
| 2009/0073811 A1 | * | 3/2009 | Unkrich | 367/127 |

* cited by examiner

*Primary Examiner*—Dan Pihulic

(57) ABSTRACT

A navigation device for navigating a user interface of a processor-controlled device includes an acoustic transmitter adapted to transmit an acoustic signal, an acoustic receiver adapted to receive the acoustic signal and located at a fixed position with respect to the acoustic transmitter, and a measurement circuit coupled to an output of the acoustic receiver and adapted to determine a distance traversed by the navigation device as a function of time.

21 Claims, 7 Drawing Sheets

ACOUSTIC NAVIGATION DEVICE AND METHOD OF DETECTING MOVEMENT OF A NAVIGATION DEVICE

BACKGROUND

As processor-based devices continue to proliferate, user interfaces are often provided to allow a user to interact with the device. For example the user interface may allow a user to adjust operating characteristics and to select features of the device made available for user control and selection by software executed by the device's processor. In any event, a user interface requires some means for a user to navigate through the user interface to indicate desired user selections. Such a navigation device can be as simple as a keypad, or as advanced as a three-dimensional motion stage.

In a large number of processor-based devices, such as personal computers (PCs) in particular, a graphical user interface (GUI) is employed. In devices employing a GUI, there is typically a need to provide a navigation device which can indicate a user's desire to move a reference point (e.g., a cursor) across the GUI. Known navigations devices include: a trackball, a touchpad, a joystick, a touchscreen, a scrollwheel, a THINKPAD® pointer, a mechanical mouse having a mouse ball and rollers, and a so-called "optical mouse."

Each of these navigation devices has its benefits, but they all also have certain limitations.

For example, trackballs tend to be large and bulky. Also, these devices get dirty and when that happens, then they perform poorly.

The mechanical mouse has been perhaps the most widely employed navigation device for PCs which employ a GUI. These devices are relatively inexpensive to manufacture and easy to use. However, perhaps even more than trackballs, these devices also get dirty and then they perform poorly.

As a result, the optical mouse has become more widely deployed in recent years. There are several variations of the optical mouse, including LED or laser illumination, imaging features directly or looking at speckle reflections, etc. However all of these devices detect relative movement of the device based on light reflected from a "mouse pad" or other reference surface along which the optical mouse is moved to an image sensor. As a result, like a mechanical mouse, the optical device requires a reference surface along which it moves. Furthermore, in the case of the optical mouse, certain surfaces—such as clean glass—will not work.

What is needed, therefore, is a navigation device that may avoid some of the disadvantages of the devices discussed above. In particular, it would be desirable to provide a navigation device that is less prone to impaired operation due to dust and small dirt particles. It would also be desirable to provide a navigation device that can operate on clean glass. It would further be desirable to provide a navigation device that can operate in free-space without any reference surface.

SUMMARY

In an example embodiment, a navigation device comprises: an acoustic transmitter adapted to transmit an acoustic signal; an acoustic receiver adapted to receive the acoustic signal and located at a fixed position with respect to the acoustic transmitter; and a measurement circuit coupled to an output of the acoustic receiver and adapted to determine a distance traversed by the navigation device as a function of time.

In another example embodiment, a method is provided for navigating a user interface provided for a processor-controlled device. The method comprises: providing a navigation device including an acoustic transmitter and an acoustic receiver located at a fixed position with respect to the acoustic transmitter; transmitting an acoustic signal from the acoustic transmitter; receiving the acoustic signal at an acoustic receiver; and determining a distance traversed by a navigation device as a function of time as a result of a user moving the navigation device to indicate a desired action in the user interface. The distance is determined based on a phase or time of arrival of the received acoustic signal.

In yet another example embodiment, a system comprises a processor-controlled device associated with a display device for providing a user interface to a user of the processor-controlled device, and a navigation device. The navigation device comprises: an acoustic transmitter adapted to transmit an acoustic signal, an acoustic receiver adapted to receive the acoustic signal and located at a fixed position with respect to the acoustic transmitter, and a measurement circuit coupled to an output of the acoustic receiver and adapted to determine a distance traversed by the navigation device as a function of time and to provide as least one navigation signal to the processor-controlled device.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

In the following detailed description, for purposes of explanation and not limitation, example embodiments disclosing specific details are set forth in order to provide a thorough understanding of an embodiment according to the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparati and methods may be omitted so as to not obscure the description of the example embodiments. Such methods and apparati are clearly within the scope of the present teachings.

Figure 1A:
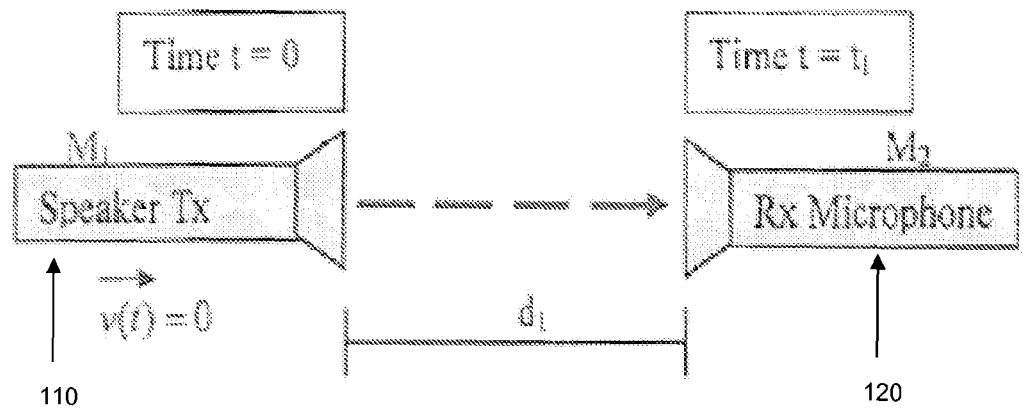
FIGS. 1A-B illustrate principles employed by one or more embodiments of a navigation device as described herein.
Figure 1B:
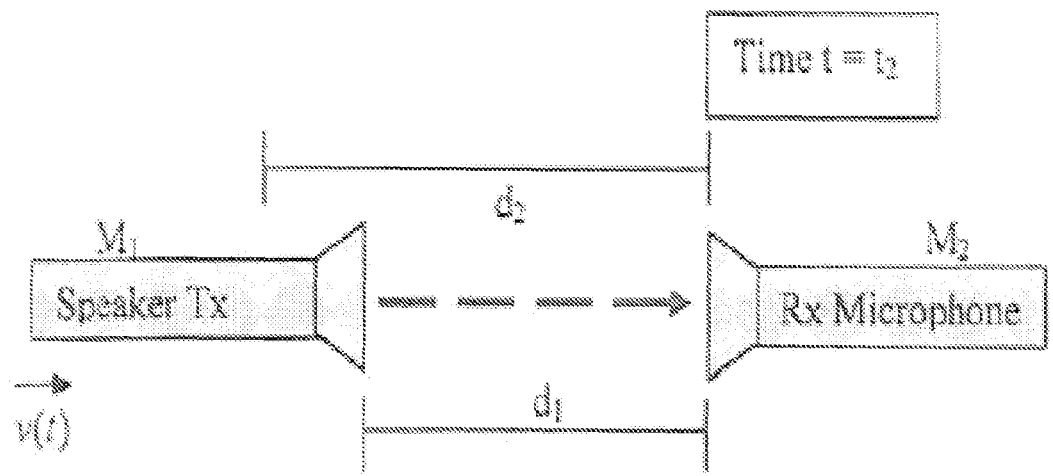

FIGS. 1A-B illustrate principles employed by one or more embodiments of a navigation device as described herein.

FIG. 1A shows an acoustic transmitter 110 (e.g., an acoustic transducer, or speaker) transmitting an acoustic signal through the air which is then received by an acoustic receiver 120 (e.g., an acoustic transducer or microphone). Acoustic receiver 120 is arranged to be at a fixed position with respect to acoustic transmitter 110. This can be done by a mechanical connection between acoustic transmitter 110 and acoustic receiver 120, for example by fixing both acoustic transmitter 110 and acoustic receiver 120 to a common assembly or housing (not shown in FIGS. 1A-B).

In FIG. 1A, acoustic transmitter 110 and acoustic receiver 120 are stationary. In this case, when an acoustic signal is launched from acoustic transmitter 110 at time t=0, then the acoustic signal is received at acoustic receiver 120 at a later time $t=t_1$ determined by the velocity of sound and the distance $d_1$ between acoustic transmitter 110 and acoustic receiver 120.

Meanwhile, in FIG. 1B, acoustic transmitter 110 and acoustic receiver 120 move with a velocity v(t). In this case, when an acoustic signal is launched from acoustic transmitter 110 at time t=0, then the acoustic signal is received at acoustic receiver 120 at a later time $t=t_2$ determined by the velocity of sound, c, and the distance $d_2$ between: (1) acoustic transmitter 110 at time t=0 when the acoustic signal was launched, and (2) acoustic receiver 120 at the time $t=t_2$ when the acoustic signal is received.

From this it can be seen that by measuring the time difference between the time when an acoustic signal is transmitted by acoustic transmitter 110 and the time when the acoustic signal is received by acoustic receiver 120 one can determine the distance traversed by acoustic transmitter 110 and acoustic receiver 120. This will now be explored in greater detail.

Figure 2:
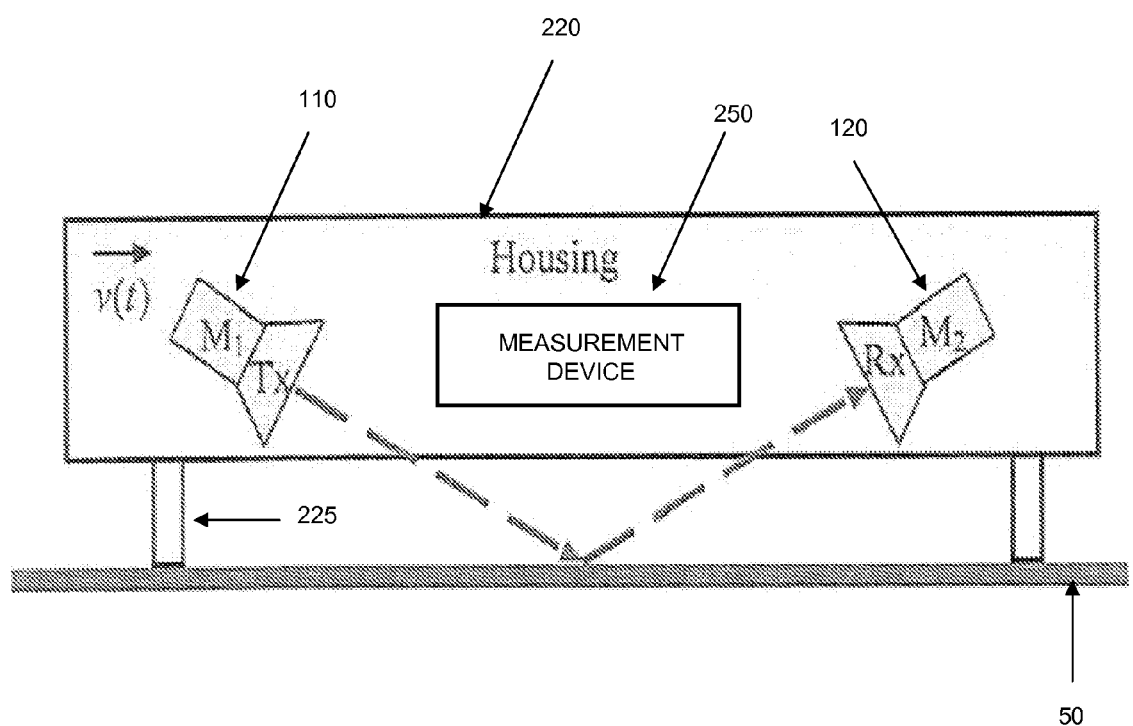
FIG. 2 shows one embodiment of an acoustic navigation device.

FIG. 2 shows one embodiment of an acoustic navigation device 200. Navigation device 200 includes acoustic transmitter 110, acoustic receiver 120, and a measurement circuit 250 provided in a housing or assembly 220, including standoffs 225. FIG. 2 also shows a reference surface 50 along which navigation 200 may move for navigation. In a beneficial feature, reference surface 50 may be a clean glass surface. In the embodiment illustrated in FIG. 2, the acoustic signal propagates from acoustic transmitter 110 to acoustic receiver 120 along an acoustic path that includes a reflection off of reference surface 50.

Now an exemplary operation of navigation device 200 will be explained.

Assume that navigation device 200 is moved such that its position varies as a function of time according to a velocity, v(t).

Also assume that an electrical excitation signal is applied to acoustic transmitter 110 to generate a single-tone acoustic signal. The electrical excitation signal, $x_1(t)$, can be represented by equation (1):

$$x_1(t) = Re[V_A e^{j(\omega t + \phi 1)}] \quad (1)$$

where signal amplitude $V_A$ and frequency $\omega$ are parameters selected for a particular system design and phase $\phi 1$ is an arbitrary phase offset.

Now the velocity of an acoustic wave in air can be represented by a constant, c, which does not vary as a function of time. Therefore the acoustic signal propagates from acoustic transmitter 110 toward acoustic receiver 120 with a velocity, c.

Meanwhile, acoustic receiver 120 outputs an electrical signal in response to the received acoustic signal. The output electrical signal, $x_2(t)$, can be represented by equation (2):

$$x_2(t) = Re[V_B(t) e^{j(\omega t + \phi 2(t))}] \quad (2)$$

Since, in general, the position of navigation device 200 varies as a function (e.g., v(t)), then the position of acoustic receiver 120 when the acoustic signal is transmitted from acoustic transmitter 110 will be different than the position of acoustic receiver 120 when the acoustic signal is received. In practical designs there may also be some amplitude variation in $x_2(t)$, but for the purpose of this analysis, the amplitude can be approximated as being constant.

More importantly, however, the time required for acoustic signal to reach acoustic receiver 120 will also vary as the position of navigation device 200 changes. Since we have assumed a single-tone acoustic signal, this means—as seen in equation (2)—that the received phase includes a component, $\phi 2(t)$, that varies as a function of time because it is dependent on the velocity of the navigation device, v(t).

First, consider the case of a stationary navigation device 200 where v(t)=0. As illustrated in FIG. 1A, the acoustic signal propagates at constant velocity c over the fixed distance $d_1$ from acoustic transmitter 110 to acoustic receiver 120. In that case, the total phase of the electrical signal output by acoustic receiver 120, $[\omega t + \phi 2(t)]$, may be written as:

$$\omega t + \varphi 2(t) = \omega\left(t - \frac{d_1}{c}\right) + \varphi_0 \quad (3)$$

From equation (3) it is seen that the output electrical signal at acoustic receiver 120 is a time-delayed version of the excitation electrical signal applied to acoustic transmitter 110, where the time delay is $d_1/c$, and where the phase $\omega_0$ is a fixed phase delay due to transducer operations.

Next, consider the general case of navigation device 200 moving at a velocity v(t). In that case, as illustrated in FIG. 1B above, there is a distance $d_2$ from the point where the acoustic signal is transmitted by acoustic transmitter 110 to the point where it is received by acoustic receiver 120. In that case, the total phase at acoustic receiver 120, $[\omega t + \phi 2(t)]$, may be written as:

$$\omega t + \varphi 2(t) = \omega\left(t - \frac{d_2}{c}\right) + \varphi_0 \quad (4)$$

From equation (4) it is seen that the phase of the output signal has changed as a result of the movement of navigation device 200.

Now, let $t_1 = d_1/c$ be the time required for the acoustic signal to propagate the distance $d_1$ from acoustic transmitter 110 to acoustic receiver 120 in the case of a stationary navigation device 200. Also, let $t_2 = d_2/c$ be the time required for the acoustic signal to propagate the distance $d_2$ from acoustic transmitter 110 to acoustic receiver 120 in the case of navigation device 200 moving with velocity v(t). Then:

$$c*t_1 + \int_0^{t_2} v(\tau)*d\tau = c*t_2 \quad (5)$$

For a constant velocity, $v(t)=v_0$, then equation (5) simplifies to:

$$c*t_1 + v_0*t_2 = c*t_2 \quad (6)$$

Solving equation (6) for $t_2$, we find that:

$$t_2 = \left(\frac{c}{c - v_0}\right) t_1 \quad (7)$$

Therefore, at any time t, the difference in phase $\Delta\phi$ of the output signal from acoustic receiver 120 between: (1) navigation device 200 moving at velocity $v(t)=v_0$, and (2) navigation device 200 being stationary (i.e., $v(t)=0$), is:

$$\Delta\phi = [\omega(t-t_2)+\phi_0] - [\omega(t-t_1)+\phi_0] = \omega(t_1-t_2) \quad (8)$$

Plugging equation (7) into equation (8), we find:

$$\Delta\varphi = \omega\left(t_1 - \left(\frac{c}{c-v_0}\right)t_1\right) = -\omega \frac{d_1}{c} \frac{v_0}{(c-v_0)} \quad (9)$$

For a velocity $v_0 \ll c$, then equation (9) simplifies to:

$$\Delta\varphi \approx -\omega \frac{d_1}{c^2} v_0 = \frac{2\pi d_1}{\lambda c} v_0 \quad (10)$$

Now, corresponding to the phase difference $\Delta\phi$ is a difference $\Delta\tau$, in time of arrival of the acoustic signal at acoustic receiver 120 between: (1) navigation device 200 moving at velocity $v(t)=v_0$, and (2) navigation device 200 being stationary (i.e., $v(t)=0$). From the equations above, it is seen that:

$$\Delta\tau = t_2 - t_1 \quad (11)$$
$$= \left(\frac{c}{c-v_0}\right)t_1 - t_1$$
$$= \left(\frac{c-(c-v_0)}{c-v_0}\right)t_1$$
$$= \left(\frac{-v_0}{c-v_0}\right)\frac{d_1}{c}$$
$$\approx \frac{-d_1}{c^2} v_0$$

Thus the time difference $\Delta\tau$ is independent of the actual frequency of the acoustic signal. So it can be seen that by measuring the phase difference $\Delta\phi$ or the time difference $\Delta\tau$, one can determine the velocity $v_0$ of navigation device 200.

In a practical application, the following values may be selected:

c=344 m/sec (speed of sound at sea level at 21° C.)
$\omega=2\pi f=2\pi*180,000$ (e.g., the peak resonance of a miniature piezoelectric microphone)
$d_1$=2 cm
$v_0$=2 cm/sec (example speed for moving the navigation sensor)

In that case, from equation (10), it is found that $\Delta\phi$=0.00382 radians.

For a system with a minimal resolvable speed or 1 mm/sec, then from equations (10) and (11) it is found that $\Delta\phi$=0.00382 radians and $\Delta\tau$=169 picoseconds. A clock with a period of 169 picoseconds corresponds to a frequency of about 5.92 GHz.

In an embodiment, the measurement of the phase difference between the excitation electrical signal applied to acoustic transducer 110, and the output electrical signal of acoustic receiver 120 can be readily implemented. In addition, a phase offset subtraction with resolution equivalent to less than the 169 picoseconds resolution would be included to minimize a slow error drift term in the distance measurement.

To find the relationship between distance traversed by navigation device 200 and $\Delta\tau$, we begin by solving equation (10) above for velocity:

$$v_0 = -\frac{c^2}{\omega * d_1} \Delta\varphi \quad (12)$$

Now assuming a constant velocity $v_0$, the distance traversed as a function of time, d(t) can be found as:

$$d(t) = \int_0^t (v_0 * d\alpha) \quad (13)$$
$$= -\int_0^t \left(\frac{c^2}{d_1} \Delta\tau * d\alpha\right)$$
$$= -\frac{c^2}{d_1} \int_0^t (\Delta\tau * d\alpha)$$
$$= -\frac{c^2}{d_1} * \Delta\tau * t$$

where $\Delta\tau$ can be measured by the difference in timing of the phase between acoustic receiver 120 and the phase at acoustic transmitter 110, with the fixed offset between them subtracted out first, equivalent to equation (11).

Furthermore, equation (13) is a good approximation in the case of a time varying velocity, v(t). In that case:

$$d(t) = -\frac{c^2}{d_1} \int_0^t \Delta\tau(\alpha) * d\alpha \quad (14)$$

For a navigation device, absolute accuracy of the motion (versus relative motion) is not necessarily important as the GUI may, for example, in software modify the speed of the reference point (e.g. a cursor) controlled by the navigation device across the GUI in a nonlinear fashion relative to the actual speed of the device.

Figure 3:
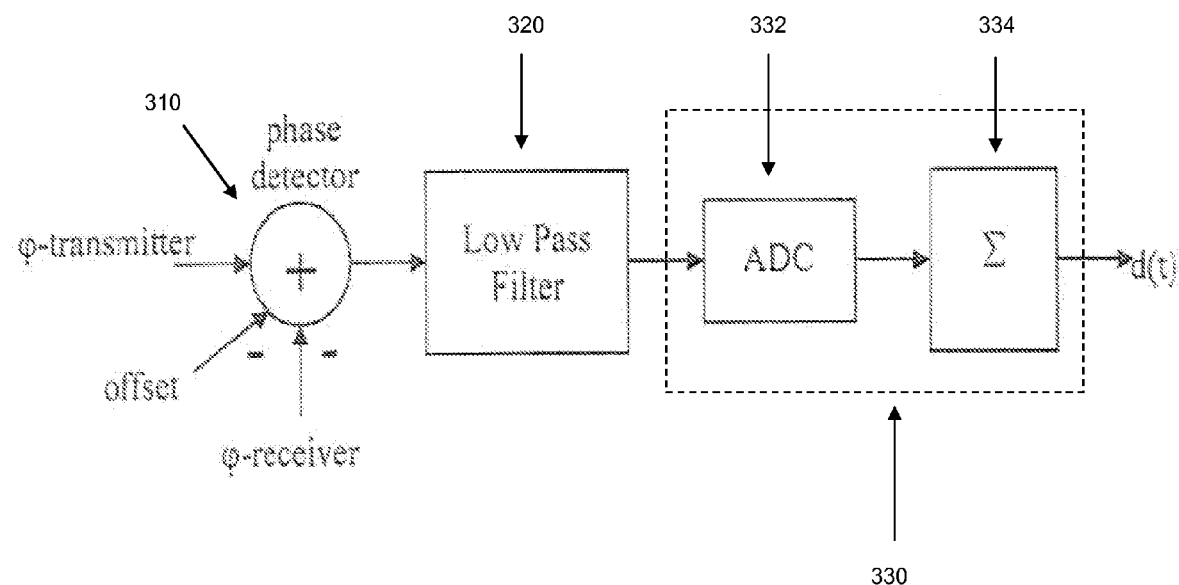
FIG. 3 shows one embodiment of a measurement circuit.

FIG. 3 shows one embodiment of a measurement circuit 250 which may be employed in navigation device 200 to determine a distance traversed by navigation device 200 as a function of time. Measurement circuit 250 includes phase detector 310, low pass filter 320, and an integrator 330. In the exemplary embodiment of FIG. 3, integrator 330 comprises an analog-to-digital converter (ADC) 332 and a digital accumulator 334.

Measurement circuit 250 measures the phase difference between the transmitted signal ($\phi$-transmitter) and the received signal ($\phi$-receiver), rather than attempting to measure the phase of each signal independently.

Phase detector 310 receives the excitation electrical signal ($\phi$-transmitter) that is applied to acoustic transmitter 110 and the output electrical signal ($\phi$-receiver) from acoustic receiver 120 and outputs a phase difference signal corresponding to a phase shift between the excitation electrical signal and the output electrical signal. In the embodiment of FIG. 3, phase detector 310 also receives an offset term (offset) corresponding to the fixed phase offset between acoustic transmitter 110 and acoustic receiver 120, for example due to the propagation of the acoustic signal across the distance $d_1$ between acoustic transmitter 110 and acoustic receiver 120. The offset term may alternatively be subtracted out at various points in the signal path (e.g. digitally from the output of the ADC 332 before digital accumulator 334).

Because acceleration of navigation device 200 may be relatively slow, especially compared to the frequency of the acoustic signal, the output of phase detector 310 may be averaged over many cycles. For example, at a frequency of 180 kHz, within a time period of 0.25 seconds of motion, the acoustic signal has over 45,000 cycles. Low pass filter 320 filters the phase difference signal from phase detector 310 for averaging and noise filtering.

Integrator 330 integrates the filtered phase difference signal over time to output a signal indicating the distance traversed by navigation device 200 as a function of time.

Of benefit, it is also possible with navigation device 200 to determine when it has been lifted off of reference surface 50, for example, by detecting when the intensity of the sound wave is reduced due to the lack of reflection from surface 50. It is possible that when navigation device 200 is lifted then a phase change will occur and be interpreted as a navigation movement. In that case, a separate sensor may be provided for detecting liftoff and/or a button may be provided for a user to depress to indicate a liftoff condition (for example, to allow the user to reposition navigation device 200 on reference surface 50 without making any corresponding movement or navigation in the user interface). Other arrangements for detecting a liftoff condition are possible.

The discussion above has illustrated how the distance traversed by navigation device 200 as a function of time can be determined with acoustic transmitter 110, acoustic receiver 120, and measurement circuit 250. Thus a user may employ navigation device 200 to navigate a user interface of a processor-controlled device (e.g., a PC employing a GUI) in a similar manner to a mechanical or optical mouse.

Figure 4:
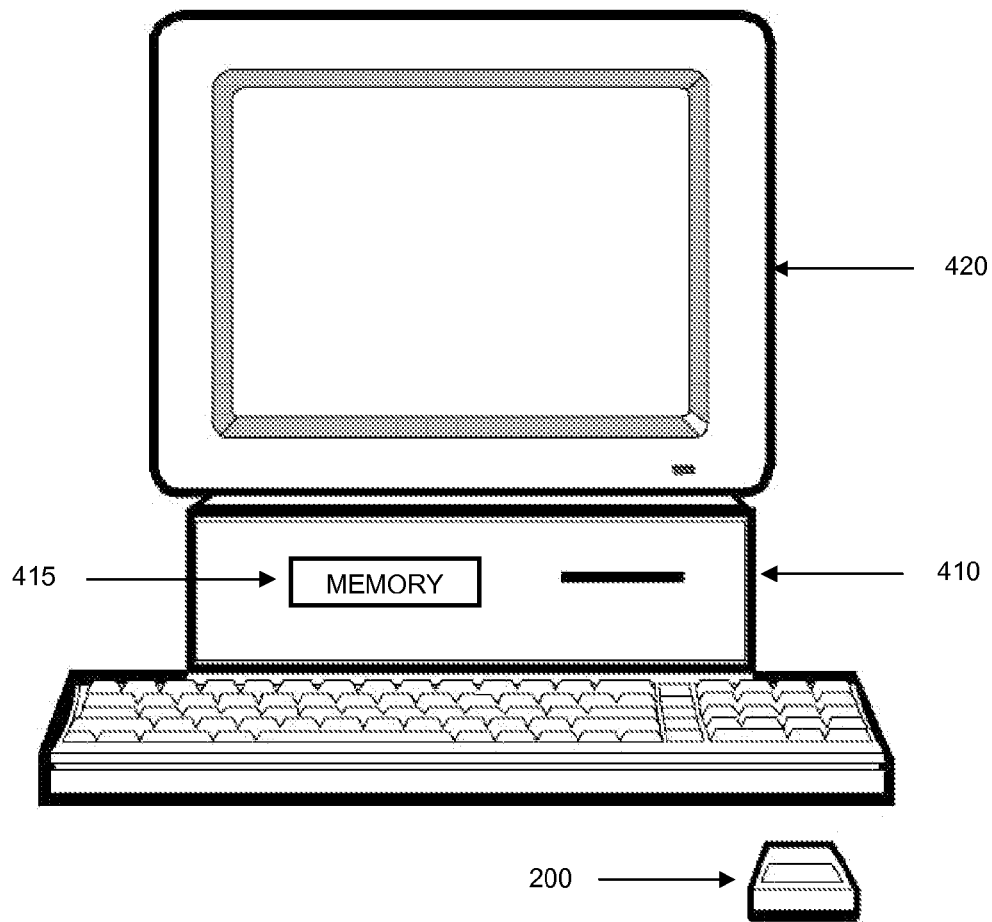
FIG. 4 illustrates one embodiment of a processor controlled device including a navigation device.

FIG. 4 illustrates one embodiment of a system 400 including a navigation device 200. System 400 includes a processor-controlled device (e.g., computer processor) 410 having associated memory 415, a display screen 420, and a navigation device 200. In the embodiment of FIG. 4, processor 410 executes a software algorithm that provides a GUI via display screen 420 that may be navigated by a user via navigation device 200. As a user moves navigation device 200 it provides at least a navigation signal to processor-controlled device 410. Of course as explained above, navigation device 200 could be employed in a variety of other types of systems having processor-controlled devices, and thus FIG. 4 simply illustrates one example.

Although the discussion above has explained how the distance traversed by navigation device 200 as a function of time can be determined in one dimension, these principles can be extended to two dimensions and three dimensions to produce a navigation device for two-dimensional (2-D) and three-dimensional (3-D) navigation. In one embodiment, the navigation device may include multiple acoustic transmitters and associated multiple acoustic receivers to span a 2-D or 3-D space for 2-D and 3-D navigation. In another embodiment, a single acoustic transmitter may be employed, and a plurality of acoustic receivers having different positions in the different directions spanning the 2-D or 3-D space (e.g., x, y, and z directions) all receive the acoustic signal from the single acoustic transmitter. In yet another embodiment, a single acoustic transmitter and a single acoustic receiver are employed with a plurality of acoustic frequencies, where each frequency propagates along a different acoustic path from the acoustic transmitter to the acoustic receiver, such that the different acoustic paths span a 2-D or 3-D space for facilitating 2-D or 3-D navigation.

Figure 5:
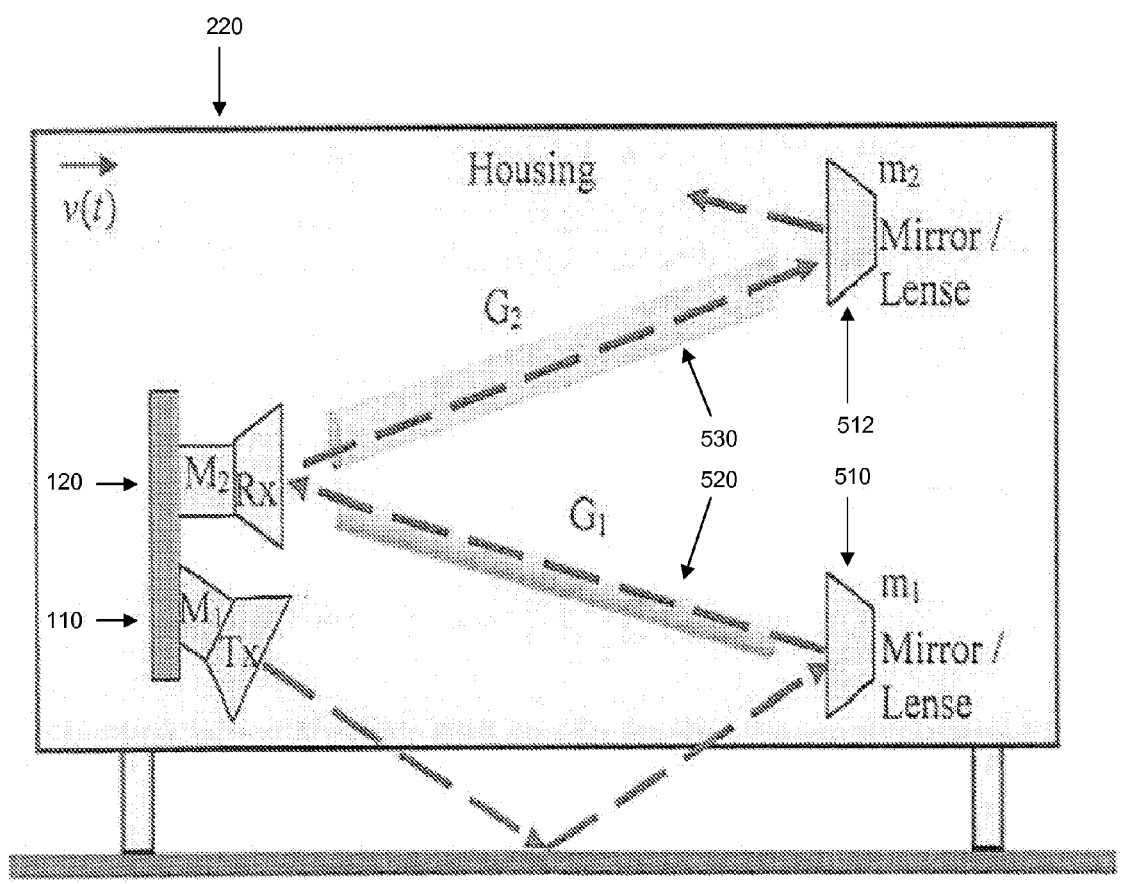
FIG. 5 shows a second embodiment of an acoustic navigation device.

FIG. 5 shows a second embodiment of an acoustic navigation device 500.

For simplification of explanation, only the differences between navigation device 400 and navigation device 200 will be explained now.

Navigation device 500 includes a first acoustic reflector 510, a first sound guide 520, a second sound guide 522, and a second acoustic reflector 512.

First acoustic reflector 510 is adapted to reflect the acoustic signal toward an input of first sound guide 520.

First sound guide 520 provides the acoustic signal to acoustic receiver 120. Although illustrated in FIGS. 5-7 as tubes, in actuality the sound guides may comprise a section of molded plastic or other material with just an exposed opening which is shaped in some manner to provide a path for the acoustic signal to enter and exit device 500. Accordingly, the term sound guide should not be narrowly construed.

The measurement device 250 measures the differential phase of the acoustic signal due to the differential relative air velocity between the acoustic signal path in the open air and the enclosed return path of sound guide 520. Meanwhile, second sound guide 522 directs any part of the acoustic signal reflected by acoustic receiver 120 away from acoustic receiver 120 such that the reflected acoustic signal is not further reflected back toward acoustic receiver 120 and helps reduce air velocity in the sound guides 520 and 530 relative to the housing 220. In this case, second sound guide 522 directs any part of the acoustic signal reflected by acoustic receiver 120 toward second acoustic reflector 522 which directs the reflected acoustic signal away from acoustic receiver 120.

Of benefit, in the navigation device 500, acoustic transmitter 110 and acoustic receiver 120 are collocated. Therefore, they may be provided in a common module, or in the same integrated circuit.

Several modifications of navigation device 500 are possible in keeping with its general principles of operation. For example, FIG. 5 shows first and second acoustic reflectors 510 and 512. However, one or both of these elements may be omitted if other means are provided for directing the acoustic signal back to acoustic receiver 120. For example, first and second sound guides 520 and 522 may be designed to channel and redirect the acoustic signal effectively in a desired direction. In particular, if first sound guide 510 can pick up the acoustic wave and redirect it back to acoustic receiver 120, then the separate acoustic reflector 520 may be omitted. Also, FIG. 5 illustrates a case where the acoustic signal propagates first from acoustic transmitter 110 through "open air," and then through sound guide 520 to acoustic receiver 120. However, the order may be swapped such that the acoustic signal propagates first from acoustic transmitter 110 through a sound guide, and then through open air back to acoustic receiver 520.

Figure 6:
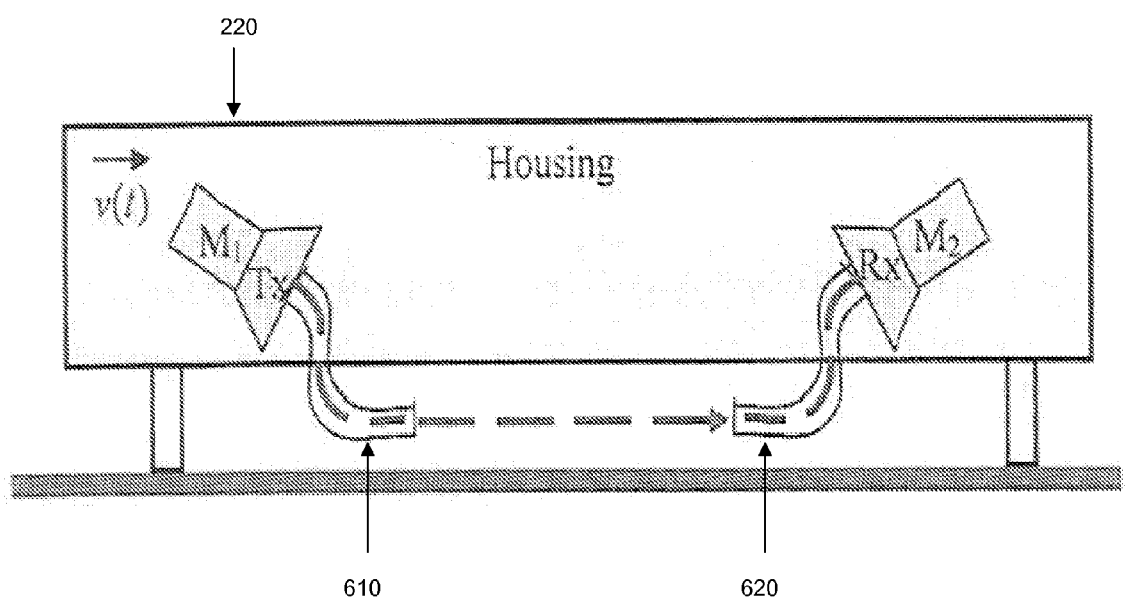
FIG. 6 shows a third embodiment of an acoustic navigation device.

FIG. 6 shows a third embodiment of an acoustic navigation device 600. For simplification of explanation, only the differences between navigation device 600 and navigation device 200 will be explained now.

Navigation device 600 includes a first sound guide 610 and a second sound guide 620 separated and spaced apart from the first sound guide 610.

In navigation devices 200 and 500, if the reference surface 50 has too much surface roughness, it may result in random signal cancellation, amplitude fluctuations, and large phase changes.

In contrast, with navigation sensor 600 the principle acoustic path from acoustic transmitter 110 and acoustic receiver 120 no longer includes reflection off of reference surface 50 so the problems associated with surface roughness can be ameliorated.

Figure 7:
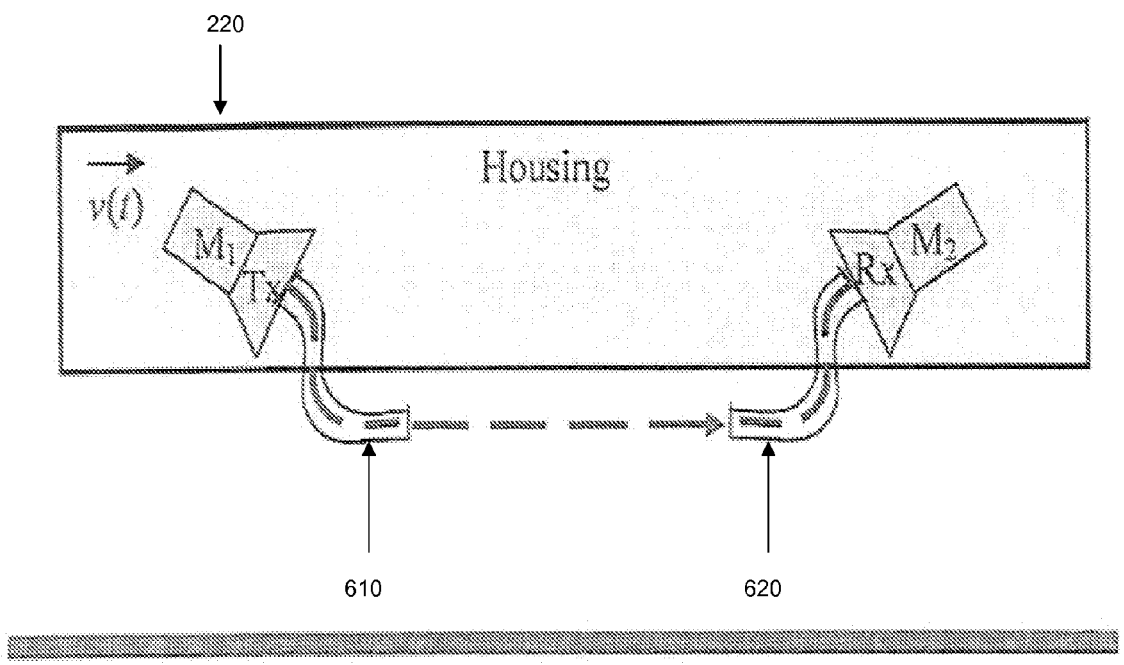
FIG. 7 shows a fourth embodiment of an acoustic navigation device.

FIG. 7 shows a fourth embodiment of an acoustic navigation device 700. This navigation device is the same as navigation device 600, except that the standoffs 225 have been removed. Navigation device 700 may be employed as a free-space navigation device without use of any reference surface. This could be especially useful for many gaming applications.

All of the navigation devices 500, 600 and 700 can be extended to 2-D and 3-D navigation, as explained above. Also, any of the navigation devices 500, 600, or 700 could be employed in the system 400 illustrated in FIG. 4.

While example embodiments are disclosed herein, one of ordinary skill in the art appreciates that many variations that are in accordance with the present teachings are possible and remain within the scope of the appended claims. The embodiments therefore are not to be restricted except within the scope of the appended claims.

The invention claimed is:

1. A navigation device, comprising:
   an acoustic transmitter adapted to transmit an acoustic signal;
   a first acoustic receiver adapted to receive the acoustic signal and located at a first fixed position with respect to the acoustic transmitter;
   a measurement circuit coupled to an output of the acoustic receiver and adapted to determine a distance traversed by the navigation device as a function of time; and
   a second acoustic receiver adapted to receive the acoustic signal and located at a second fixed position with respect to the acoustic transmitter,
   wherein the measurement circuit is further coupled to an output of the second acoustic receiver and adapted to determine a distance traversed by the navigation device as a function of time in both a first direction and a second direction different from the first direction, where the first and second directions span a two-dimensional space.

2. The device of 1, further comprising a housing adapted to be moved by a human hand to navigate a user interface of a processor-based device.

3. The device of claim 2, further comprising a first sound guide in an acoustic path between the acoustic transmitter and the first acoustic receiver.

4. The device of claim 3, further comprising a second sound guide separated and spaced apart from the first sound guide in the acoustic path between the acoustic transmitter and the first acoustic receiver,
   wherein the first sound guide is adapted to guide the acoustic signal toward an input of the second sound guide, and
   wherein the second sound guide is adapted to provide the acoustic signal to the acoustic receiver.

5. The device of claim 3, wherein the acoustic transmitter and the first acoustic receiver are collocated in a common module or in a same integrated circuit, wherein the navigation device further comprises means for channeling the acoustic signal back toward the first acoustic receiver.

6. The method of claim 5, wherein the measurement circuit determines a distance traversed by the navigation device as a function of time as a result of there being a difference, when the navigation device is moved, between: (1) an average velocity of the air through which the acoustic signal is propagating in the open; and (2) an average velocity of the air through which the acoustic signal is propagating in the sound guide.

7. The device of claim 3, further comprising a second sound guide separated and spaced apart from the first sound guide, wherein the second sound guide is adapted to direct any part of the acoustic signal reflected by the first acoustic receiver away from the first acoustic receiver such that the reflected acoustic signal is not further reflected back toward the first acoustic receiver, and is further adapted to minimize air velocity in the first sound guide.

8. The device of claim 1, wherein:
   the acoustic transmitter is adapted to receive an electrical excitation signal and in response thereto to generate and transmit the acoustic signal having at least a first frequency;
   the acoustic receiver is adapted to output an output electrical signal in response to the received acoustic signal, and
   the measurement circuit is adapted to measure a phase difference at the first frequency between the excitation electrical signal and the output electrical signal and to determine therefrom the distance traversed by the navigation device as a function of time.

9. The device of claim 1, further comprising means for determining when the navigation device has been lifted off a reference surface on which it navigates.

10. A navigation device, comprising:
    an acoustic transmitter adapted to transmit an acoustic signal;
    an acoustic receiver adapted to receive the acoustic signal and located at a fixed position with respect to the acoustic transmitter; and
    a measurement circuit coupled to an output of the acoustic receiver and adapted to determine a distance traversed by the navigation device as a function of time,
    wherein the acoustic transmitter is adapted to receive an electrical excitation signal and in response thereto to generate and transmit the acoustic signal having at least a first frequency;
    wherein the acoustic receiver is adapted to output an output electrical signal in response to the received acoustic signal,
    wherein the measurement circuit is adapted to measure a phase difference at the first frequency between the excitation electrical signal and the output electrical signal and to determine therefrom the distance traversed by the navigation device as a function of time, and
    wherein the measurement device comprises:
       a phase detector adapted to receive the excitation electrical signal and the output electrical signal and to output a phase difference signal corresponding to a phase shift between the excitation electrical signal and the output electrical signal,
       a low pass filter adapted to filter the phase difference signal from the phase detector; and
       an integrator adapted to integrate the filtered phase difference signal over time to output a signal indicating the distance traversed by the navigation device as a function of time.

11. The device of claim 10, wherein the acoustic receiver comprises one of an electret condenser microphone, a piezoelectric microphone, and a capacitive silicon microelectromechanical system.

12. The device of claim 10, wherein:
the transmitted acoustic signal further includes a second frequency; and
the measurement circuit is further adapted to measure a second phase difference at the second frequency between the excitation electrical signal and the output electrical signal, and in response thereto to determine the distance traversed by the navigation device as a function of time in both a first direction and a second direction different from the first direction, where the first and second directions span a two-dimensional space.

13. The device of claim 10, further comprising:
a second acoustic transmitter adapted to transmit a second acoustic signal; and
a second acoustic receiver adapted to receive the second acoustic signal and located at a second fixed position with respect to the second acoustic transmitter,
wherein the measurement circuit is adapted to determine the distance traversed by the navigation device as a function of time in both a first direction and a second direction different from the first direction, where the first and second directions span a two-dimensional space.

14. The device of claim 10 wherein the measurement circuit is adapted to determine the distance traversed by the navigation device as a function of time in each of: a first direction; a second direction different from the first direction, and a third direction different from the first and second directions, where the first, second, and third directions span a three-dimensional space.

15. The device of claim 10, further comprising means for determining when the navigation device has been lifted off a reference surface on which it navigates.

16. A method of navigating a user interface provided for a processor-controlled device, the method comprising:
providing a navigation device including an acoustic transmitter and an acoustic receiver located at a fixed position with respect to the acoustic transmitter;
transmitting an acoustic signal from the acoustic transmitter;
receiving the acoustic signal at an acoustic receiver; and
determining a distance traversed by a navigation device as a function of time as a result of a user moving the navigation device to indicate a desired action in the user interface, wherein the distance is determined based on a phase or time of arrival of the received acoustic signal,
wherein the user navigates with the navigation device in free space without reference to any surface.

17. The method of claim 16, wherein the distance traversed by the navigation device as a function of time is determined in at least a first direction and a second direction different from the first direction, where the first and second directions span a two-dimensional space.

18. The method of claim 17, wherein the distance traversed by the navigation device as a function of time is also determined in a third direction different from both the first and second directions, where the first, second and third directions span a three-dimensional space.

19. The method of claim 16, further comprising:
providing an electrical excitation signal to the acoustic transmitter to generate the acoustic signal having at least a first frequency; and
outputting an output electrical signal from the acoustic receiver in response to the received acoustic signal, and
wherein determining a distance traversed by a navigation device includes measuring a phase difference at the first frequency between the excitation electrical signal and the output electrical signal.

20. The method of claim 16, further comprising guiding the acoustic signal through a first sound guide in an acoustic path between the acoustic transmitter and the acoustic receiver.

21. The method of claim 16, wherein the navigation device includes a second acoustic transmitter and a second acoustic receiver, the method further comprising:
transmitting a second acoustic signal from the acoustic transmitter;
receiving the second acoustic signal at an acoustic receiver;
wherein the distance traversed by the navigation device as a function of time is determined in both a first direction and a second direction, where the first and second directions span a two-dimensional space.

* * * * *